(12) United States Patent
Kiraly et al.

(10) Patent No.: US 8,170,330 B2
(45) Date of Patent: May 1, 2012

(54) MACHINE LEARNING FOR TISSUE LABELING SEGMENTATION

(75) Inventors: Atilla Peter Kiraly, Plainsboro, NJ (US); Christopher V. Alvino, Allenwood, NJ (US); Hong Shen, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 821 days.

(21) Appl. No.: 12/261,383

(22) Filed: Oct. 30, 2008

(65) Prior Publication Data

US 2009/0116737 A1 May 7, 2009

Related U.S. Application Data

(60) Provisional application No. 60/983,587, filed on Oct. 30, 2007.

(51) Int. Cl.
*G06K 9/62* (2006.01)

(52) U.S. Cl. .................... 382/159; 382/156; 382/190

(58) Field of Classification Search ............... 382/118, 382/156, 159, 180
See application file for complete search history.

(56) References Cited

U.S. PATENT DOCUMENTS

| | | | | |
|---|---|---|---|---|
| 6,671,391 | B1 * | 12/2003 | Zhang et al. | 382/118 |
| 7,359,555 | B2 * | 4/2008 | Porikli et al. | 382/204 |
| 7,680,341 | B2 * | 3/2010 | Perronnin | 382/224 |
| 7,792,353 | B2 * | 9/2010 | Forman et al. | 382/159 |
| 7,903,861 | B2 * | 3/2011 | Luo et al. | 382/132 |
| 7,958,063 | B2 * | 6/2011 | Long et al. | 706/12 |
| 2006/0104494 | A1 * | 5/2006 | Collins et al. | 382/128 |
| 2008/0063285 | A1 * | 3/2008 | Porikli et al. | 382/190 |
| 2009/0132901 | A1 * | 5/2009 | Zhu et al. | 715/206 |

* cited by examiner

*Primary Examiner* — Gregory M Desire

(57) ABSTRACT

A method for directed machine learning includes receiving features including intensity data and location data of an image, condensing the intensity data and the location data into a feature vector, processing the feature vector by a plurality of classifiers, each classifier trained for a respective trained class among a plurality of classes, outputting, from each classifier, a probability of the feature vector belong to the respective trained class, and assigning the feature vector a label according to the probabilities of the classifiers, wherein the assignment produces a segmentation of the image.

18 Claims, 4 Drawing Sheets

MACHINE LEARNING FOR TISSUE LABELING SEGMENTATION

CROSS-REFERENCE TO RELATED APPLICATIONS

This application claims the benefit of Provisional Application No. 60/983,587 filed on Oct. 30, 2007 in the United States Patent and Trademark Office, the content of which is herein incorporated by reference in its entirety.

BACKGROUND

1. Technical Field

The present disclosure is directed machine learning, and more particularly to machine learning for tissue labeling segmentation.

2. Discussion of Related Art

Statistical based segmentation approaches for multiple organs and tissues within medical images make use of relative organ locations and intensities to define and refine the segmentation. These approaches use the creation of several tissue models based on different images features such as location and intensity levels.

An exemplary approach for automated labeling of tissues within abdominal CT scan data uses three different models to obtain label probabilities: intensity models, spatial models, and neighbor probability models. The probability models are chosen and the probability output crafted to adequately account for the probabilities from the three models. The segmentation occurs by initializing the image with the intensity probabilities and then applying iterative conditional modes (ICM) or simulated annealing methods to refine the initialization into the final segmentation. Other improved approaches may also be used, such as belief propagation. FIGS. 1A-B illustrate the creation of the probabilities from the intensity (FIG. 1A) and spatial (FIG. 1B) models for n different labels using this method.

Referring more particularly to FIGS. 1A-B, the two models (intensity and spatial) must be manually created for each label. Given the intensity value (101), it is given to the models (102 to 104) and probabilities are created (105 to 107). Similarly, given the spatial value (108), it is given to the models (109 to 111) and probabilities are created (112 to 114) with the given location. The highest intensity and spatial probabilities are taken as factors in determining the assigned label. Further manual design is necessary to determine the proper way to combine the probabilities to obtain the best segmentation. The proposed methods allow for a more scientific and automated approach to model creation and the combination of probabilities.

These approaches can be used in labeling of MR brain images with maximum likelihood estimation. A statistical approach may be used using an assumed Gibbs distribution. In another technique, spatially-variant mixture model estimates are used for pixel labeling of clinical MR brain images, wherein densities are modeled by univariate Gaussian functions.

In the above examples, models are created and combined for the observed distributions. Although the model chosen is based upon knowledge of the problem and an idea of the general distribution, no quantitative evidence is given as to suggest why a particular model is optimal for the problem. Possible over-fitting and requirements for a large among of training data appear in a histogram modeled distribution. For a parametric model such a Gaussian function the distribution may not be properly modeled under any situation. Testing other distribution or weightings for existing models can be a tedious procedure.

Therefore, a need exists for a machine learning approach, viewing the input locations, intensities, etc. as features and the distributions as classifier outputs, a more methodological approach can be taken to develop and evaluate an improved distribution model for given training datasets.

BRIEF SUMMARY

According to an embodiment of the present disclosure, a method for directed machine learning includes receiving features including intensity data and location data of an image, condensing the intensity data and the location data into a feature vector, processing the feature vector by a plurality of classifiers, each classifier trained for a respective trained class among a plurality of classes, outputting, from each classifier, a probability of the feature vector belong to the respective trained class, and assigning the feature vector a label according to the probabilities of the classifiers, wherein the assignment produces a segmentation of the image.

According to an embodiment of the present disclosure, a method for directed machine learning includes receiving features including intensity data and location data of an image, determining intensity probabilities and spatial probabilities for the intensity data and the location data, respectively, condensing the intensity probabilities and the spatial probabilities into a feature vector, processing the feature vector by a plurality of classifiers, each classifier trained for a respective trained class among a plurality of classes, outputting, from each classifier, a probability of the feature vector belong to the respective trained class, and assigning the feature vector a label according to the probabilities of the classifiers, wherein the assignment produces a segmentation of the image.

BRIEF DESCRIPTION OF THE DRAWINGS

Preferred embodiments of the present disclosure will be described below in more detail, with reference to the accompanying drawings.

DETAILED DESCRIPTION OF PREFERRED EMBODIMENTS

According to an embodiment of the present disclosure, a machine learning approach creates and combines spatial and intensity models for image segmentation. More specifically, the intensity and spatial features of sets of images are taken as features for a machine learning problem. According to an embodiment of the present disclosure, such a treatment of features enables an image segmentation problem to be taken from an image processing domain to a machine learning domain.

The machine learning may take any of a variety of methods that are quantitatively evaluated to demonstrate a model. Herein, examples using a Support Vector Machines (SVM) are compared to an elliptical model. Other approaches such as Gaussian mixture models and Bayesian Networks are also possible. A machine learning approach offers a methodological approach to creating and developing models. The incorporation and combination of features to develop new models is also described.

Figure 2:
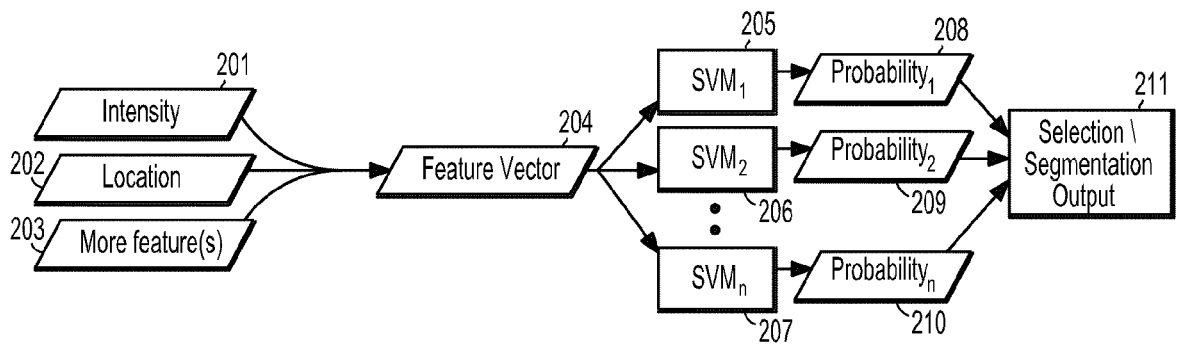
FIG. 2 is a flow diagram of a method for machine learning taking the intensity and location data as features according to an embodiment of the present disclosure.

Referring to FIG. 2, intensity and location data are viewed as features for a machine learning method. By using these features, the problem of weighting different probabilities becomes an optimization problem in the machine learning field. Additionally the models are created automatically through the training data. In this example, intensity data (block 201), location data (block 202), and additional features (block 203), for example, the distance from the patient's skin, are condensed into a feature vector (block 204). The feature vector (block 204) is passed to multiple trained SVMs (blocks 205 to 207). Each SVM is a two-class classifier trained on the classes label versus all other labels. Each SVM accepts a feature vector (e.g., series of numerical inputs) and produces a single numerical output. The output of each SVM is used directly as a probability (blocks 208 to 210). Although SVMs do not directly output a probability, they can be configured to do so. The feature vector is assigned a label according to the probabilities of the classifiers (block 211), wherein the assignment produces a segmentation of the image. The assignment can be based on, for example, a highest probability for the feature vector among the outputs of the SVMs.

Through the use of intensity and location data as features, the creation of the SVM models may be automated and a scientific approach may be taken in the combination of the probabilities. In the example of FIG. 2, the SVM model processes all features so the combination is already included in the model specification. Additionally, the model can be compared against other classifiers via sensitivity and specificity evaluations.

Figure 1A:
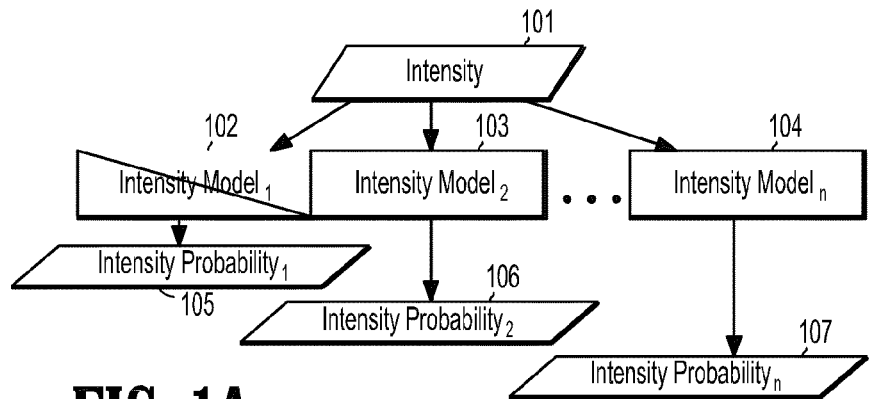
FIG. 1A illustrates the creation of the probabilities from an intensity model for n different labels.
Figure 1B:
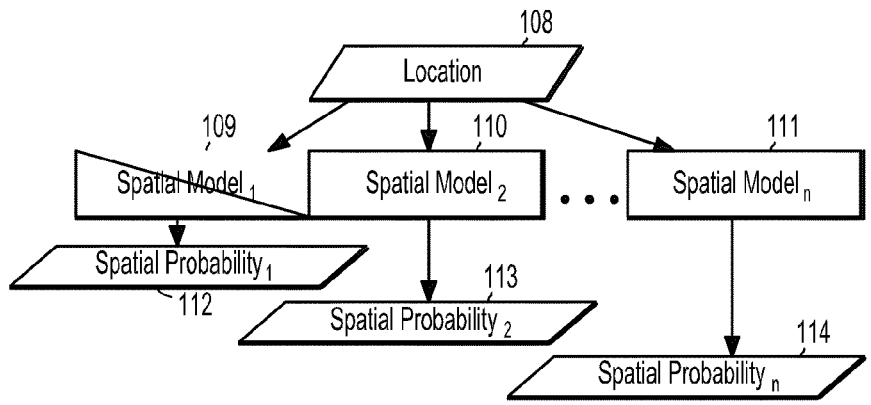
FIG. 1B illustrates the creation of the probabilities from a spatial model for n different labels.

The effectiveness of an exemplary machine learning approach using multiple SVMs for determining tissue label probabilities in abdominal CT scans is demonstrated as against an approach using selected parametric or non-parametric models for the spatial and intensity probabilities without quantitative evidence of the optimality. FIG. 1 shows a flowchart of this general model.

According to an embodiment of the present disclosure, qualitatively evaluated classifiers are used as probability models. Although classifiers typically output binary decisions, their output may be viewed as a probability distribution. As an example of one possible model, the intensity, location, and additional features are combined into a single feature vector as shown in FIG. 2. Multiple binary SVMs are used with radial basis functions trained to identify the vector as either tissue or not tissue. In the exemplary approach of machine learning, the output of the SVM is used as the probability vector. Although SVMs do not directly report probability, it is adequate for the example to compare the values directly. Since the intensity, location, or any additional features are part of the feature vector, the only adaptive design concern is in a weighting of each feature in the SVM training.

Figure 3:
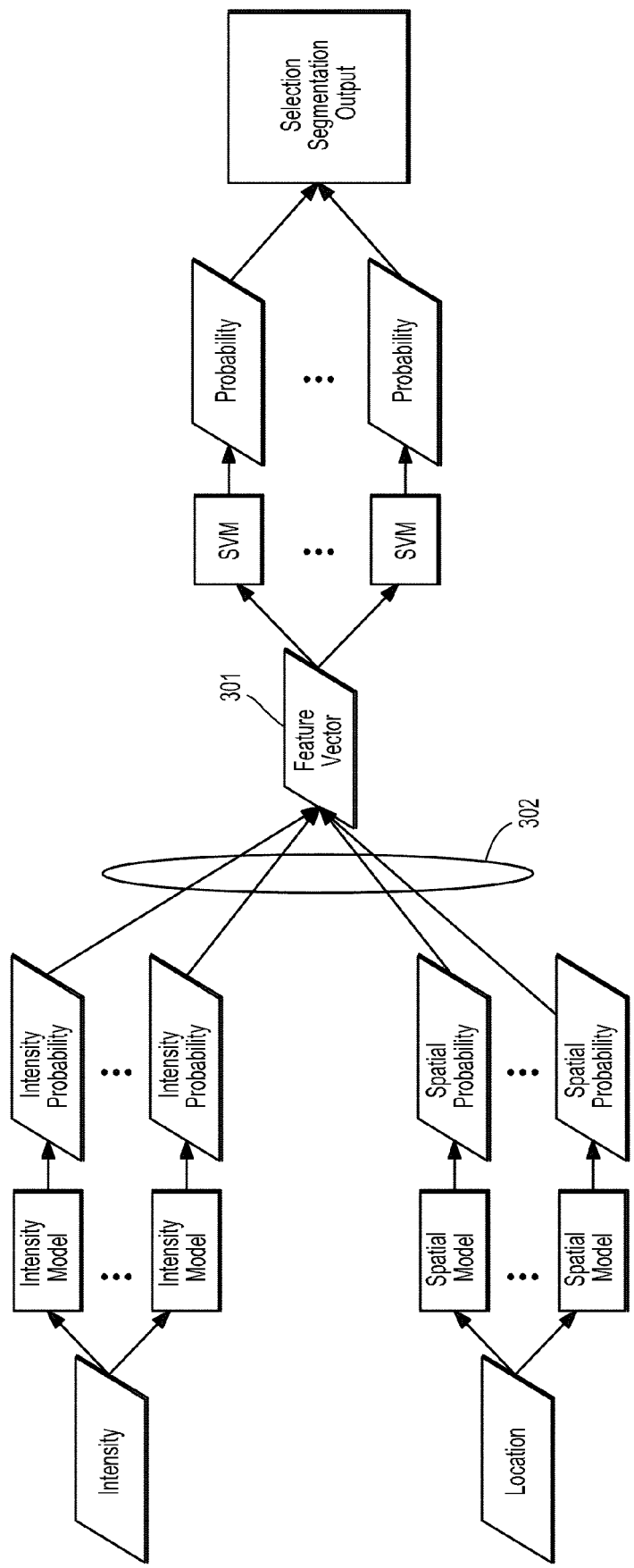
FIG. 3 is a flow diagram of a method for machine learning taking the intensity and location based probabilities as features according to an embodiment of the present disclosure.

Multiple probability models, as in FIG. 3, can be introduced by constructing a feature vector (block 301) of intensity and/or location information from the outputs (block 3) 302). This arrangement uses a second series of SVMs for any remaining features. In this example, the advantage of a methodological model design still holds. The decision of combining the probability values is made within the SVM. Since these values are again viewed as features, a machine learning approach can be used.

Figure 4A:
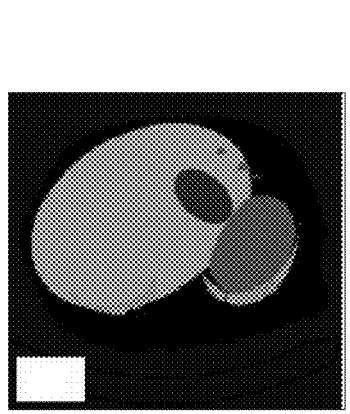
FIGS. 4A-G are spatial and intensity initializations for tissue segmentation according to an embodiment of the present disclosure.
Figure 4B:
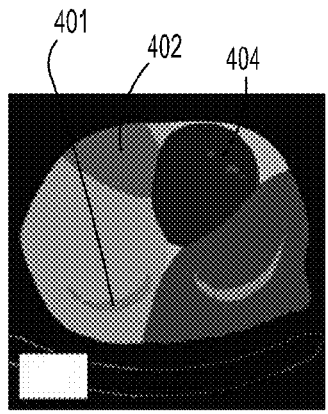
Figure 4C:
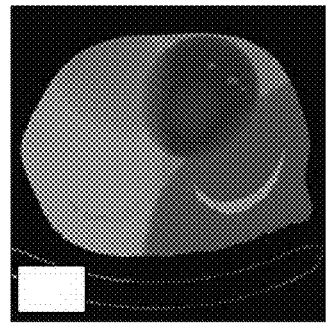

The use of SVMs to develop models is shown in FIGS. 4A-G. In FIG. 4A, the labeled output an elliptical spatial models is shown. In this case, parametric ellipsoidal function was used to model the spatial locations of organs. Different models may be selected for different organs. Instead of designing the model on a per organ basis on intuition of the features and problem, according to an embodiment of the present disclosure, a quantitative methodology is use to select a best model (e.g., according to probabilities). Toolkits for analyzing features in machine learning may be used for these purposes. As shown in FIGS. 4B and 4C, using the given ground truth data, improved spatial distributions are possible in this case.

Figure 4D:
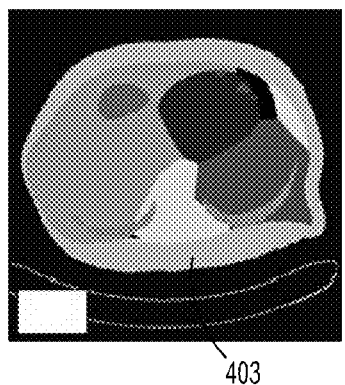
Figure 4E:
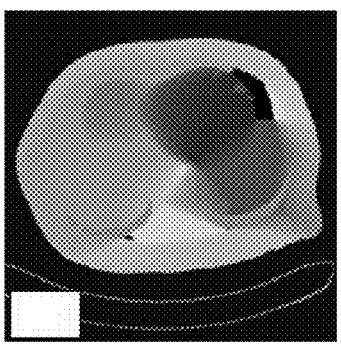
Figure 4F:
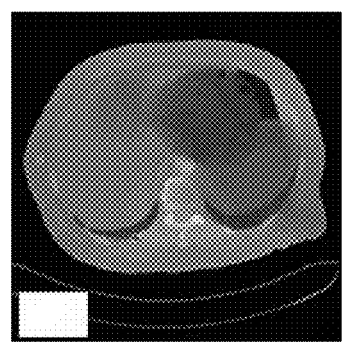
Figure 4G:
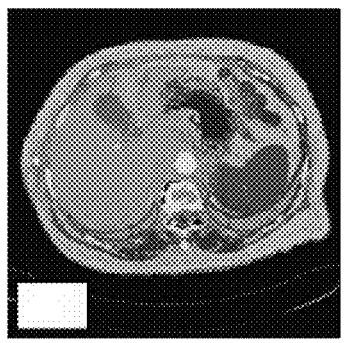

In FIGS. 4D to 4F, an additional spatial feature of the distance from the skin was readily added. The training of the SVMs simply incorporated this additional feature. In contrast to the elliptical model, this additional feature would needed a model re-design. For example, a 4D ellipsoidal function to account for the fourth spatial feature is necessary. Another possibility would involve two spatial models per label whose outputs must be properly combined. These issues quantitatively addressed in proposed method. The results of the use of intensity feature combines with the spatial features as outlined in FIG. 2 is shown in FIG. 4G. The impact of the intensity into the model is significant over the previous figures.

Again, FIGS. 4A-G demonstrate the initialization of segmentation and not the final result. The SVM models can also be used with ICM or belief propagation to achieve the final results. A sufficient number of ground truth or training datasets are needed to ensure a valid design (e.g., 95% confidence—one of ordinary skill in the art would recognize that a verity of thresholds and a measures may be used to measure or determine a valid design) and substantially avoid overfitting the data. This is expected since the problem relies less on intuition from an image processing stand point and more on optimizing a classifier for a given set of features.

According to an embodiment of the present disclosure, models are established to predict probability values for tissue labels in statistical segmentation of organs. The use of machine learning methods substantially eliminates the need to manually created ad hoc probability models for different aspects of the system. It also substantially eliminates the need to balance different probability models to ensure a valid result.

In FIGS. 4A-G, an exemplary method according to the present is disclosure is demonstrated using a multiple SVM approach to establish a spatial initialization of the segmentation against a parametric elliptical model. The addition of features allows for customization of the spatial regions. After initialization, these models can be used with ICM (Iterated Conditional Modes) or belief propagation to produce the results.

The limitations of this method are the same as those within any machine classification approach. A larger amount of training data would be more beneficial. Given a sufficiently large number of training datasets available, a method according to an embodiment of the present disclosure offers a scientific and predictable pathway to the development of the models needed for statistical segmentation methods.

Referring to FIGS. 4A-G, spatial and intensity initializations are shown for tissue segmentation in a three-dimensional (3D) abdomen computed tomography (CT) image. In each case, different segmentation shading or colors can represent different tissue regions. The lungs and inner air portions of the colon are pre-determined and therefore hold fixed shading/color labels; first and second colors (401 and 402). For example, a third color (403) represents fat and light (404) represents the liver. In FIGS. 4A, 4B, 4D and 4G, only the maximal probability tissue label is shown. FIGS. 4C, 4E and 4F blend tissue labels based on the probability values of each label are shown. FIG. 4A shows the initialization result of the manually created spatial distribution models. The process involves manually evaluating the segmented ground truth images and determining a model. The models in the remaining images are automatically created from the ground truth images using the SVM classifiers. FIGS. 4B and 4C are the spatial initialization models based on the 3D location within the dataset. FIGS. 4D and 4F shows the same initialization, but with the distance from the skin added as an additional spatial feature. In FIG. 4F, the original data is shown. FIG. 4G shows the initialization with added intensity features. The use of the SVM classifier allows for more appropriate shapes to be used without additional complexity in the design process.

It is to be understood that embodiments of the present disclosure may be implemented in various forms of hardware, software, firmware, special purpose processors, or a combination thereof. In one embodiment, a software application program is tangibly embodied on a program storage device. The application program may be uploaded to, and executed by, a machine comprising any suitable architecture.

Figure 5:
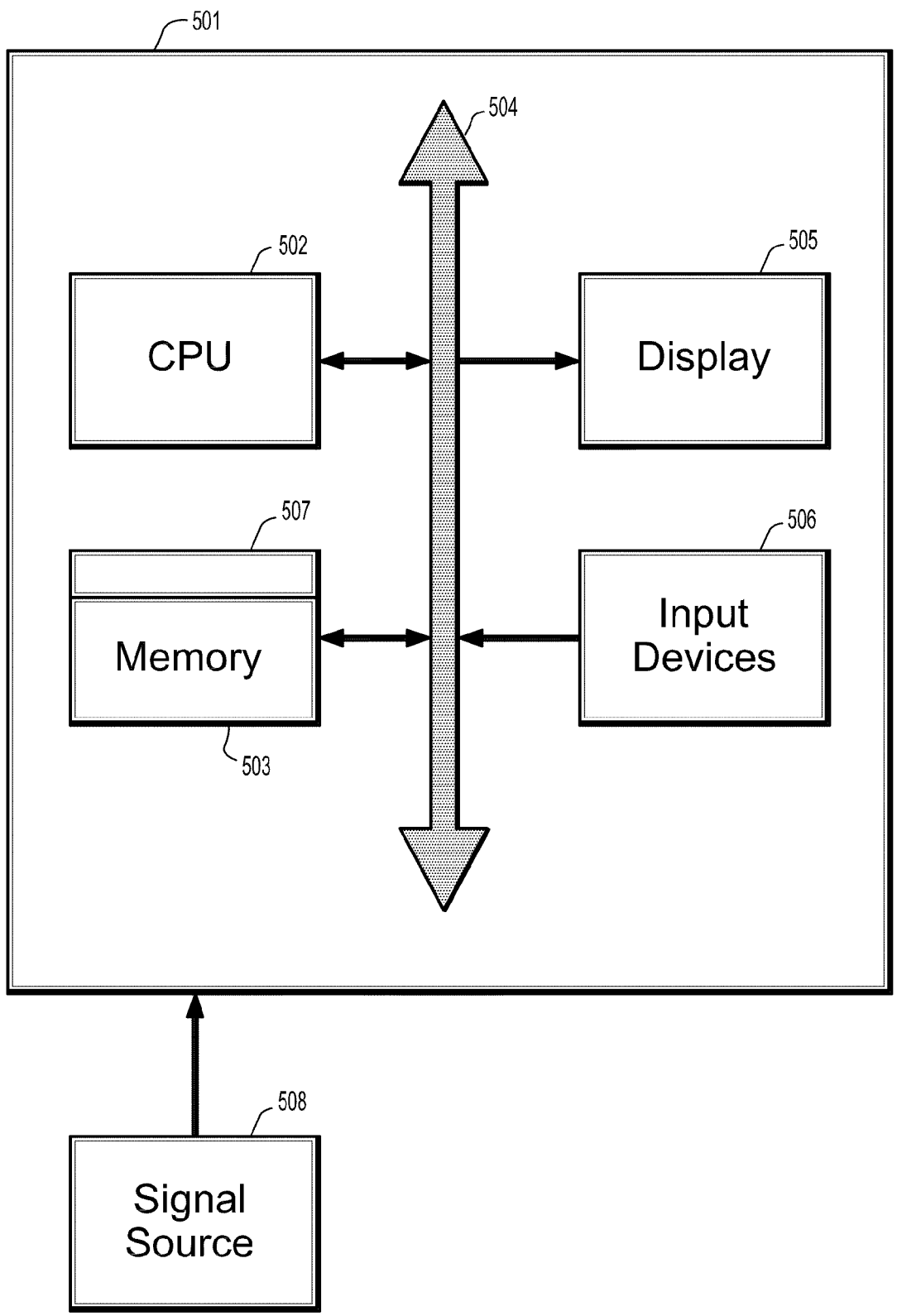
FIG. 5 is a diagram of an exemplary computer-system for supporting directed machine learning according to an embodiment of the present disclosure.

Referring now to FIG. 5, according to an embodiment of the present disclosure, a computer system (block 501) for directed machine learning includes, inter alia, a central processing unit (CPU) (block 502), a memory (block 503) and an input/output (I/O) interface (block 504). The computer system (block 501) is generally coupled through the I/O interface (block 504) to a display (block 505) and various input devices (block 506) such as a mouse and keyboard. The support circuits can include circuits such as cache, power supplies, clock circuits, and a communications bus. The memory (block 503) can include random access memory (RAM), read only memory (ROM), disk drive, tape drive, etc., or a combination thereof. The present invention can be implemented as a routine (block 507) that is stored in memory (block 503) and executed by the CPU (block 502) to process the signal from the signal source (block 508). As such, the computer system (block 501) is a general purpose computer system that becomes a specific purpose computer system when executing the routine (block 507) of the present disclosure.

The computer platform (block 501) also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the system is programmed. Given the teachings of the present disclosure provided herein, one of ordinary skill in the related art will be able to contemplate these and similar implementations or configurations of the present disclosure.

Having described embodiments for directed machine learning, it is noted that modifications and variations can be made by persons skilled in the art in light of the above teachings. It is therefore to be understood that changes may be made in embodiments of the present disclosure that are within the scope and spirit thereof.

What is claimed is:

1. A computer implemented method for directed machine learning comprising:
   receiving a plurality of features including an intensity data feature and an location data feature of an image;
   condensing the intensity data feature and the location data feature into a feature vector;
   processing the common feature vector by each of a plurality of classifiers, each classifier trained for a respective trained class among a plurality of classes;
   outputting, from each classifier, a value of the feature vector corresponding to the respective trained class; and
   assigning the feature vector a label according to a comparison of the values of the classifiers, wherein the label corresponds to a classifier having a selected value from among the values of the classifiers, and wherein the assignment produces a segmentation of the image.

2. The computer implemented method of claim 1, wherein the classifiers execute a binary support vector machine with radial basis functions trained to identify the feature vector as either tissue or not tissue.

3. The computer implemented method of claim 1, wherein the classifiers execute a Gaussian mixture classification for selecting the selected value from among the values of the classifiers.

4. The computer implemented method of claim 1, wherein the classifiers execute a Bayesian Network based classification for selecting the selected value from among the values of the classifiers.

5. The computer implemented method of claim 1, further comprising training each classifier according to a predetermined weighting of each feature, wherein the assignment of the feature to the label implicitly includes the predetermined weighting of the classifier outputting the selected value, wherein different classifiers have different predetermined weightings.

6. The computer implemented method of claim 1, wherein condensing further comprises condensing a spatial feature into the feature vector.

7. A computer readable medium embodying instructions executable by a processor to perform a method for directed machine learning, the method steps comprising:
   receiving a plurality of features including an intensity data feature and an location data feature of an image;
   condensing the intensity data feature and the location data feature into a feature vector;
   processing the common feature vector by each of a plurality of classifiers, each classifier trained for a respective trained class among a plurality of classes;
   outputting, from each classifier, a value of the feature vector corresponding to the respective trained class; and
   assigning the feature vector a label according to a comparison of the values of the classifiers, wherein the label corresponds to a classifier having a selected value from among the values of the classifiers, and wherein the assignment produces a segmentation of the image.

8. The computer readable medium of claim 7, wherein the classifiers execute a binary support vector machine with radial basis functions trained to identify the feature vector as either tissue or not tissue.

9. The computer readable medium of claim 7, wherein the classifiers execute a Gaussian mixture classification from among the values of the classifiers.

10. The computer readable medium of claim 7, wherein the classifiers execute a Bayesian Network based classification from among the values of the classifiers.

11. The computer readable medium of claim 7, further comprising training each classifier according to a predetermined weighting of each feature, wherein the assignment of the feature to the label implicitly includes the predetermined weighting of the classifier outputting the selected value, wherein different classifiers have different predetermined weightings.

12. The computer readable medium of claim 7, wherein condensing further comprises condensing a spatial feature into the feature vector.

13. A computer implemented method for directed machine learning comprising:
   receiving features including intensity data and location data of an image;
   determining intensity probabilities and spatial probabilities for the intensity data and the location data, respectively;
   condensing the intensity probabilities and the spatial probabilities into a feature vector;
   processing the feature vector by a plurality of classifiers, each classifier trained for a respective trained class among a plurality of classes;
   outputting, from each classifier, a probability of the feature vector belong to the respective trained class; and
   assigning the feature vector a label according to the probabilities of the classifiers, wherein the assignment produces a segmentation of the image.

14. The computer implemented method of claim 13, wherein the classifiers execute a binary support vector machine with radial basis functions trained to identify the feature vector as either tissue or not tissue.

15. The computer implemented method of claim 13, wherein the classifiers execute a Gaussian mixture classification for selecting a probability from among the probabilities output by the classifiers.

16. The computer implemented method of claim 13, wherein the classifiers execute a Bayesian Network based classification for selecting a probability from among the probabilities output by the classifiers.

17. The computer implemented method of claim 13, further comprising training each classifier according to a predetermined weighting of each feature, wherein the assignment of the feature to the label implicitly includes the predetermined weighting of the classifier outputting a selected probability from among the probabilities output by the classifiers, wherein different classifiers have different predetermined weightings.

18. The computer implemented method of claim 13, wherein condensing further comprises condensing a spatial feature into the feature vector.

* * * * *